April 21, 1942.　　　G. C. HAMILTON　　　2,280,071
LAMINATED FLOORING
Filed Nov. 27, 1937　　　2 Sheets-Sheet 1
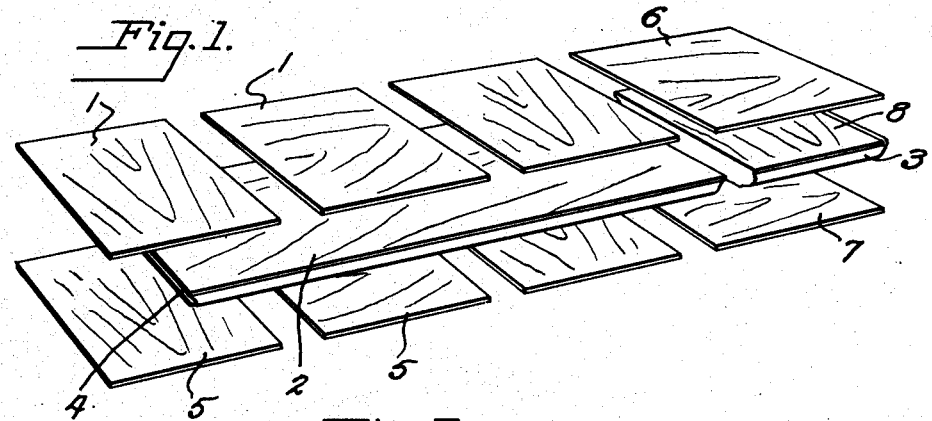
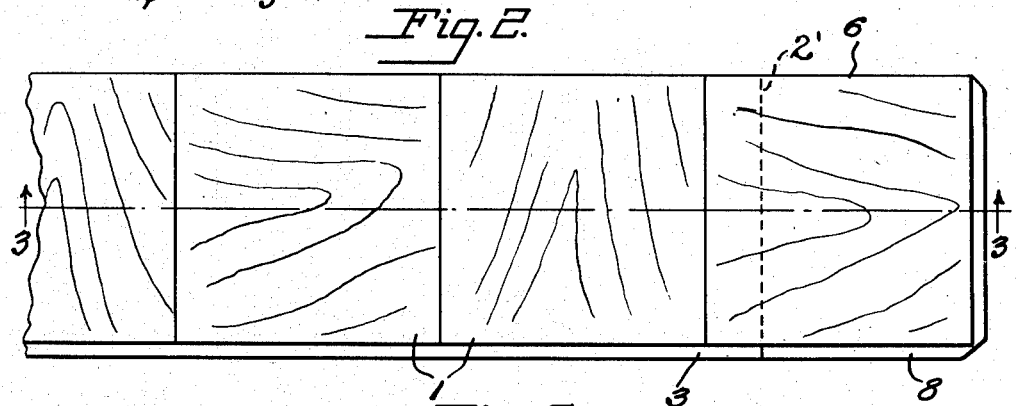
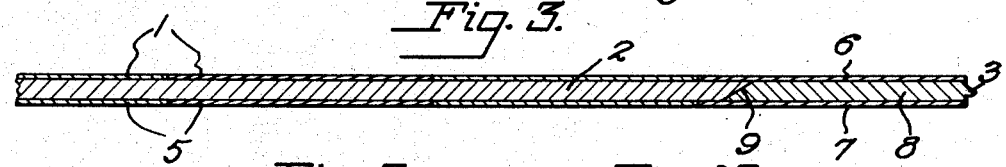
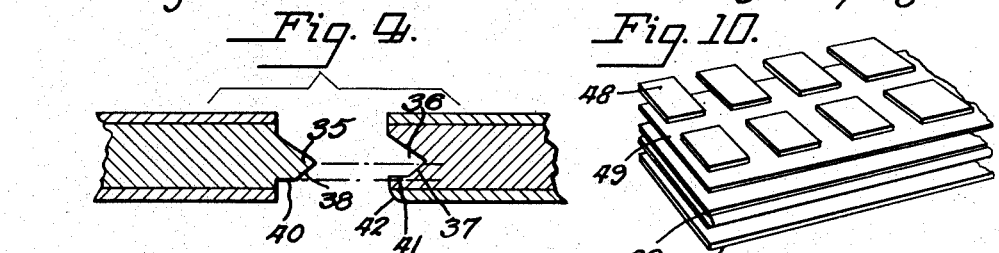
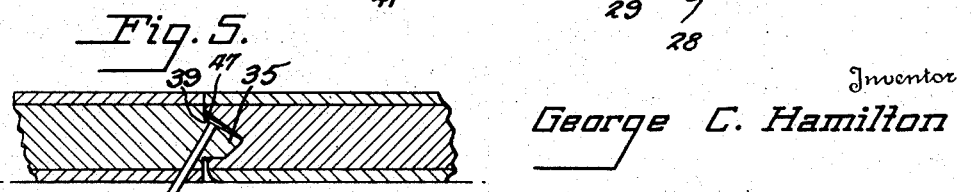
Inventor
George C. Hamilton
By Mason Fenwick Lawrence
Attorneys April 21, 1942.  G. C. HAMILTON  2,280,071
LAMINATED FLOORING
Filed Nov. 27, 1937  2 Sheets—Sheet 2

Inventor
George C. Hamilton
By Mason Fenwick + Lawrence
Attorneys

Patented Apr. 21, 1942

2,280,071

UNITED STATES PATENT OFFICE 2,280,071

LAMINATED FLOORING

George C. Hamilton, McComb, Miss.

Application November 27, 1937, Serial No. 176,903

3 Claims. (Cl. 20—8)

This invention relates to laminated flooring.

One of the objects of the invention is to provide a wooden flooring unit having a plurality of plies integrally united, including a jointed or parquet face ply in which contiguous parquet units are arranged with the grain at right angles, an intermediate ply or lamination long enough to include a plurality of the parquet units, and a back ply composed of joined units placed opposite the parquet face units and with the grain on the face and back units lying parallel whereby warping of the flooring unit in any direction is prevented.

Another object of the invention is to provide a flooring unit of the type described in which the intermediate ply is of sufficient thickness to embody the entire tongue and groove.

Still another object of the invention is to provide a laminated flooring unit in which the grain of the intermediate ply at both ends of the unit runs perpendicularly to the direction of the grain in the front and back sections at said ends, to prevent transverse warping or cupping which would occur if the grain in both front and back plies at one end and the grain of the intermediate ply at said end should run parallel and lengthwise of the unit.

A further object of the invention is to provide a laminated flooring unit or plank in which the grain of the back ply extends longitudinally of the plank, the face ply being formed of parquet units joined both widthwise as well as lengthwise of the plank forming a plurality of pairs of sections, the side by side sections of each pair having the grain lying in perpendicular directions, and each alternate pair having the direction of the grain reversed, the result being to produce a zig-zag region extending longitudinally of the plank in which the grain on corresponding portions of the front and back plies extends in the same direction, fortifying the plank against longitudinal warping, and an alternate zig-zag region in which the grain on the face side runs at right angles to the grain on the back, inhibiting cupping or transverse warping.

Another object of the invention is the provision in flooring generally of a scientifically designed tongue and groove construction which shall provide a nailing surface normal to the plane of the nail head when the latter is driven at the proper angle, and in which the tongue shall wedgingly engage the groove to firmly hold the grooved side of the plank against the sub-floor or base to which the tongue side of the adjacent plank has previously been nailed, and in which a permanently closed sliding joint is formed positively holding the grooved side of the plank down to the sub-base or floor, notwithstanding that through the shrinkage of the flooring, the wedging faces of the tongue and groove may have separated.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 1 is a view in perspective and in separated relation of the several elements which go to make up a flooring unit or plank embodying the principles of the present invention;

Figure 2 is a plan view;

Figure 3 is a section taken along the line 3—3 of Figure 2;

Figure 4 is a fragmentary transverse section through adjacent flooring units illustrating the matching qualities of the tongue and groove;

Figure 5 is a view similar to Figure 4, the tongue and groove being in closed relation, one plank being nailed to the sub-floor or base;

Figure 10 is a perspective view illustrating an alternative construction to that shown in Figures 6 and 9.

Figure 6:
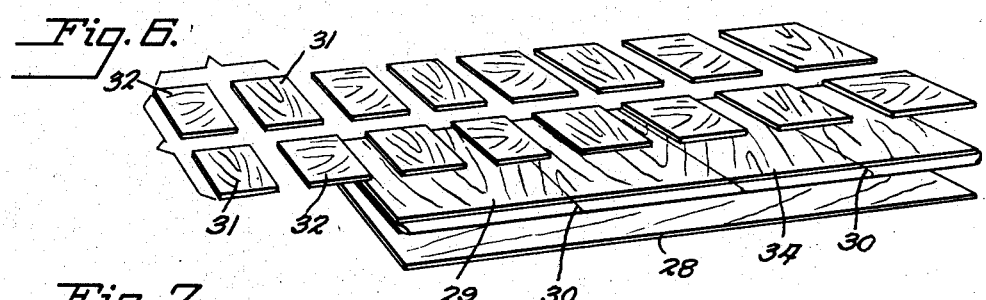
Figure 6 is a similar view to that of Figure 1 illustrating a modified form of the invention.

Referring now to that form of the invention illustrated in Figures 1, 2 and 3, the numeral 1 represents a parquet unit or section of thin wood, which in the illustrated embodiment of the invention is square although this particular shape is by no means essential to the invention. A plurality of these parquet units 1 arranged lengthwise constitutes the surface ply of the fabricated plank. The parquet units 1 are arranged with the grain of adjacent units running relatively perpendicularly, that is to say, the grain of the first unit at the left runs transversely while the grain of the next unit extends longitudinally of the plank. Since it is intended that the flooring unit shall be matched endwise with similar units, each plank will always consist of an even number of parquet units, the grain at one end extending transversely while that at the other runs longitudinally.

The intermediate ply 2 is a board with the grain running longitudinally and is preferably of such thickness as to provide for the entire tongue 3 and groove 4. The bottom ply is constituted by a plurality of units 5, each preferably of the same shape an size as the parquet units 1 and correspondingly arranged, that is to say, the units 1 and 5 occupying corresponding positions on opposite sides of the intermediate ply 2 have their grain running in the same direction. Thus they have a balancing effect upon the tendency of the fabricated plank to warp, the units 1 and 5 which have the grain extending crosswise preventing longitudinal cupping and warping of the plank, while those which have the grain running lengthwise inhibit the transverse warping of the plank. This holds true of the entire flooring unit excepting that end in which the grain of both the intermediate ply and the face and back plies would extend in the same direction. Normally there would be nothing at such a point to prevent the transverse warping of the plank. Consequently, I prefer to cut off the intermediate ply 2 at a point 2' between the face unit 6 and the back unit 7 whose grain runs longitudinally and substitute the cut portion by a section 8, the grain of which runs transversely. The intermediate ply 2 and the section 8 are preferably joined by a scarf joint 9 which is shown in Figure 3. The cross grain of the section 8 inhibits the tendency to transverse warping of the units 6 and 7.

In fabricating the flooring unit according to Figure 1, the surfaces of all the parts which are to contact are coated with a thermosetting cement such as Bakelite. Bakelite cement is a water-proof agent which is manufactured in several forms, but in the case of the present invention it is preferred to use it in the form of a paint which is applied, to the surfaces of the wood which are to contact, either by brushing or spraying. It hardens rapidly, will reliquefy at 300° F., and again hardens very rapidly, almost instantaneously. After this reliquefaction under heat it cannot again be reliquefied by heat nor dissolved in water, steam or chemicals. Its bonding strength depends upon the amount of pressure prevailing at the instant of liquefaction. These characteristics are common to all wood-bonding agencies, which are absolutely waterproof, and which are all embraced in the class of substances which thermoset at high temperature and high pressure. For best results, the pressure should be all that the wood will withstand without rupture. The instant after the liquefaction of the bonding agent has taken place, the wood may be removed from the heat and pressure-applying instrumentalities. No cooling of the glue line is required for the efficacy of the joint. A glue or cement containing water is inadapted to the manufacture of the laminated flooring of the present invention inasmuch as the surfaces of the plies to which the cement would be applied would absorb the moisture causing the ply to become distorted, to warp and twist and swell. Furthermore, it would be impossible to evaporate all of the water prior to the application of the heat and pressure so that steam pockets would be formed between the plies forming blisters and unadhered areas.

Upon being released from pressure, the integrally laminated units are stored, in the rough until the moisture content has been brought up to that of atmosphere. The unit is then dressed, or planed very lightly on both of its faces, and the tongues and grooves are worked into it.

Figure 7:
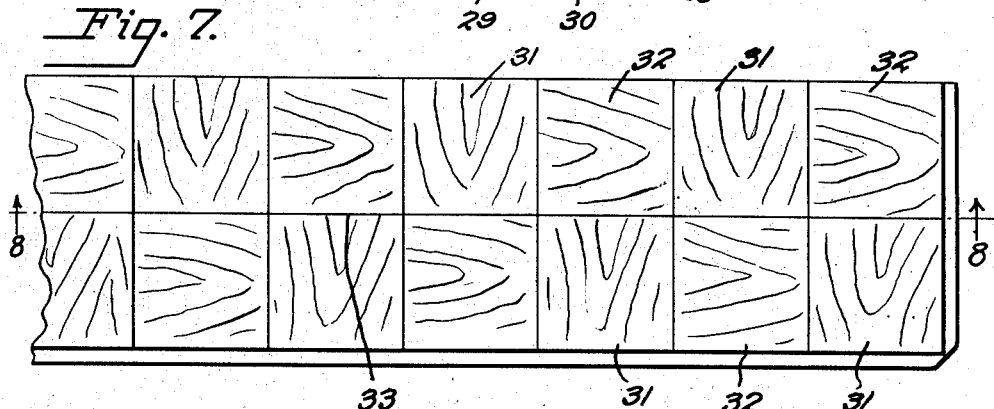
Figure 7 is a plan view of the flooring unit shown in Figure 6.
Figure 8:
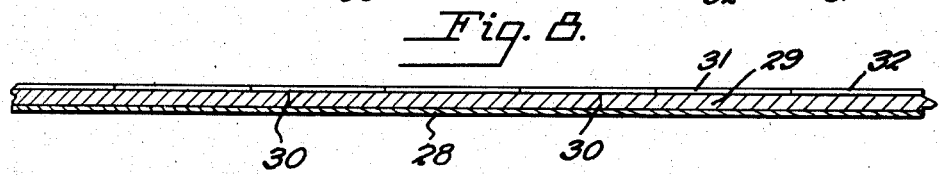
Figure 8 is a cross section taken along the line 8—8 of Figure 7.

In Figure 6 a modified form of my invention is shown in which the back ply 28 is preferably a single piece with the grain extending longitudinally. The nature of the intermediate ply is immaterial to the invention. In the example herein shown and described, it comprises a plurality of sections 29 cementitiously joined as at 30 and with the grain extending crosswise. The face ply is composed of a plurality of small units or sections 31 and 32. As illustrated, they are square but their shape is unimportant. They are half the width of the plank and joined along the longitudinal median line of the plank as at 33 in Figure 7. The units 31 have the grain extending transversely while the alternate units 32 have the grain extending longitudinally. The direction of the grain in the face ply is so referred to the grain in the back ply that the grain in those areas of the back ply which correspond to the units 32 forms a zig-zag region extending lengthwise of the plank in which the grain of both front and back plies extend in the same direction, thus fortifying the plank against transverse warping, while the grain in those areas of the back ply which correspond to the units 31 lies perpendicular to the grain of the units 31 forming a zig-zag region extending lengthwise of the plank which reinforces the plank against cupping or longitudinal warping. The intermediate ply 34 is preferably of such thickness as to carry the entire tongue and groove and the three plies including the units of the face ply are integrally united by a thermosetting cement in the same manner as has been described in that form of the invention illustrated in Figures 1, 2 and 3.

Figure 9:
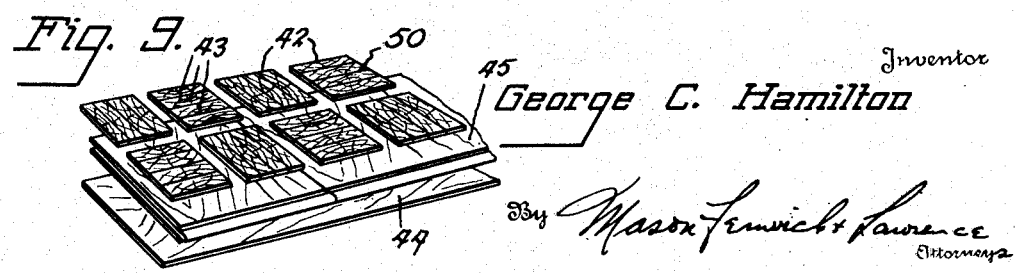
Figure 9 is a view similar to Figure 6, part broken away showing a modified form of surface ply.

Figure 9 illustrates a modified form of the invention in which the units 31 are substituted by the units 42 which are formed of pieces cut across the grain, with the ends of the grain perpendicular to the plane of the floor.

In order for these end grain units to have a warp balancing function they must be made so that they will expand more in one direction than in the other.

Normally, wood cut across the grain will have the same coefficient of expansion across the grain in all directions. If the blocks are made oblong the aggregate linear expansion will be greater in the longitudinal direction of the block than in the transverse direction. If the block is square, it may be made of a plurality of sections 43 as shown. It will expand to a greater extent in the direction of the length of these sections than in a direction across the joints 50 between the sections, for the contacting surfaces of the blocks at the joints, are touching upon high spots and part of the expanion is absorbed at the joints.

The units 42 formed of sections 43 as described are arranged alternately with respect to the lay of the sections 43, relative to a back ply 44 which may be similar to the back ply 28 and an intermediate ply 45 similar to the intermediate ply 29, whereby in the finished flooring unit, the direction of expansion in the front ply units, referred to the back ply, formed a zig-zag region lengthwise of the plank in which the plank is fortified against transverse warping, and an adjacent zig-zag region in which the plank is braced against longitudinal warping.

Figure 10 illustrates a slightly modified form of the invention in which the face sections 48 which may have the grain lying flat, as in Figure 6 or exposing the edge grain as in Figure 9 rest upon an additional ply 49 which intervenes between the face sections and the intermediate multi-piece ply 29 of Figure 6 or the ply 45 of Figure 9. This ply 49 constitutes an integral "backbone" between the divided face and intermediate plies, materially strengthening the structure of the unit.

Figures 4 and 5 illustrate the tongue and groove construction. It will be observed that the nose or forward portion 35 of the tongue is wedge-shaped and fits into the correspondingly wedge-shaped portion 36 of the groove. Preferably the height of the apex of the tongue above the plane of the base of the plank is slightly lower than the height of the apex of the groove so that when adjacent planks are pushed together the lower face 37 of the groove will be forced down against the lower face 38 of the tongue. The upper face of the tongue is inclined at such an angle as to be parallel with the nail head 39 when the nail is driven in at the proper angle as shown, to penetrate the wood of the plank proper below and to the rear of the tongue. If the tongue and groove were wedge-shaped throughout their cross sectional extent, the entire joint would open when the planks shrink upon drying out in seasons when houses are heated artificially and the grooved side of the plank would spring up above the plane of the floor. To obviate this, I have cut off the lower part of the tongue forming a face 40 parallel to the base of the plank, and the groove has been correspondingly shaped forming the cooperating face 41 also parallel to the base of the plank. When the joint opens under the conditions attending the drying out of the plank as described, the faces 40 and 41 never separate, but merely slide rectilinearly in contact with one another.

The upper face of the angle of the groove is a little closer to vertical than the upper face of the angle of the tongue so that when these members are interengaged there will be a slight crevice 47 between the upper side of the tongue and groove, sufficient to accommodate the head of the nail, avoiding the need of sinking the nails with a nail-set.

The thickness of the plank beneath the face 41 of the groove is slightly greater than the thickness of the plank below the face 40 of the tongue so that after the tongue side of the plank has been firmly nailed in place it is necessary to force the underlying portion of the adjacent grooved plank beneath the tongue. This assures a tight joint. The lower edge 42 below the groove is preferably slightly rounded to prevent the breaking off of a sliver which would happen if the edge were sharp and which sliver would get into the abutting faces of the planks preventing a close joint.

It will be understood to those skilled in the art that by the above described embodiments of my invention, I have endeavored to illustrate a principle that the specific details as shown and described are to be considered by way of example and not as restricting the scope of the invention as defined in the appended claims.

What I claim is:

1. Laminated wooden flooring unit comprising an intermediate core ply, face and back plies cemented thereto, said face and back plies being divided into sections, the sections of each ply alternating; with the grain running perpendicularly, and corresponding sections of both the face and back plies covering congruent areas of the core ply and being placed with the grain parallel, whereby one alernate set of congruent sections inhibits longitudinal warping of the unit, while the other alternate set of congruent sections inhibits transverse warping resisting warping of the unit either transversely or longitudinally.

2. Laminated wooden flooring unit comprising an intermediate core ply, face and back plies cemented thereto, said face and back plies being divided into an even number of longitudinally disposed sections, the sections of each ply being alternately arranged with the grain running perpendicularly whereby the grain runs transversely of the unit at one end and longitudinally at the other, the corresponding sections on both the face and back plies covering congruent areas of the core ply and being disposed with the grain parallel, and the core ply being of two joined parts, one having the grain running longitudinally of the unit, the other having the grain running transeversely, the latter being positioned between the end sections which have the grain running longitudinally of the unit the joint between said parts being beneath that face and back sections at one end of the unit which have the grain extending longitudinally of the unit.

3. A laminated wooden flooring unit comprising, an intermediate core ply, face and back plies cemented thereto, said face ply being formed with the grain extending perpendicular to the surface of the intermediate ply, and being divided transversely and also along the median longitudinal line of the unit into a plurality of pairs of sections, each section constituting a plurality of juxtaposed strips comprising its surface area, the strips of adjacent sections throughout the unit both transversely and longitudinally thereof being disposed in direction perpendicular to each other whereby alternate zigzag patterns are formed lengthwise of the unit, said core ply being relatively thick and being formed with a tongue and groove adapted to be matched with similar units.

GEORGE C. HAMILTON.